US011315088B1

United States Patent
McCully et al.

(10) Patent No.: US 11,315,088 B1
(45) Date of Patent: Apr. 26, 2022

(54) GEOLOCATION AND PHYSIOLOGICAL SIGNALS FOR TRANSACTION INITIATION

(71) Applicant: Wells Fargo Bank, N.A., San Francisco, CA (US)

(72) Inventors: Jannette Marie McCully, Belmont, CA (US); Michael H. Chang, Millbrae, CA (US); Russell Sage Hamilton, San Francisco, CA (US); Gerardo Costilla, San Francisco, CA (US); Darius A. Miranda, San Francisco, CA (US); Muhammad Farukh Munir, Pittsburg, CA (US); Traci H. Nguyen, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 77 days.

(21) Appl. No.: 16/201,096

(22) Filed: Nov. 27, 2018

(51) Int. Cl.
*G06Q 40/02* (2012.01)
*G06Q 20/10* (2012.01)
*G06F 16/2455* (2019.01)

(52) U.S. Cl.
CPC ......... *G06Q 20/10* (2013.01); *G06F 16/2455* (2019.01); *G06Q 40/02* (2013.01)

(58) Field of Classification Search
CPC .................................................. G06Q 20/10
USPC .......................................................... 705/14
See application file for complete search history.

(56) References Cited

U.S. PATENT DOCUMENTS

| | | |
|---|---|---|
| 2013/0268440 A1 | 10/2013 | Tierney et al. |
| 2014/0149287 A1 | 5/2014 | Mafolsire |
| 2014/0180790 A1* | 6/2014 | Boal ................... G06Q 30/0211 705/14.42 |
| 2015/0206108 A1 | 7/2015 | Taylor et al. |
| 2016/0104187 A1* | 4/2016 | Tietzen .............. G06Q 30/0233 705/14.33 |
| 2016/0132917 A1 | 5/2016 | Carney, II et al. |
| 2016/0203497 A1 | 7/2016 | Tietzen et al. |
| 2016/0232502 A1 | 8/2016 | Barbulescu et al. |

(Continued)

FOREIGN PATENT DOCUMENTS

WO    WO-2014074426 A1    5/2014

OTHER PUBLICATIONS

IEEE Communications Surveys & Tutorials (vol. 21, Issue: 3, pp. 2849-2885) Authors: Yutong Liu • Linghe Kong • Guihai Chen [+details] (Year: 2019).*

(Continued)

*Primary Examiner* — Bruce I Ebersman
*Assistant Examiner* — John A Anderson
(74) *Attorney, Agent, or Firm* — Schwegman Lundberg & Woessner, P.A.

(57) ABSTRACT

A method may include collecting, in a data store, a plurality of signals associated with a user and a geographic area; calculating, using at least one processor, a satisfaction score for the user with respect to the geographic area based on the plurality of signals; querying the data store to retrieve a set of entities associated with the geographic area; generating, using the at least one processor, a respective credit allocation amount for each of the set of entities based on the satisfaction score and a user-specified allocation modality; and initiating a transfer from a user account to a set of receiver accounts according to the respective generated credit allocation amounts.

12 Claims, 5 Drawing Sheets

(56) References Cited

U.S. PATENT DOCUMENTS

2016/0352737 A1    12/2016  Pitman
2017/0165526 A1     6/2017  bakun
2018/0005161 A1*    1/2018  Cong ............... G06Q 10/06398

OTHER PUBLICATIONS

Merrill, Nick, et al., "Habits of the Heart(rate): Social Interpretation of Biosignals in Two Interaction Contexts", BioSENSE Lab, School of Information University of California, Berkeley Conference'10, Month 1-2, 2010, City, State, Country. Copyright 2010 ACM, (2010), 8 pgs.

* cited by examiner

GEOLOCATION AND PHYSIOLOGICAL SIGNALS FOR TRANSACTION INITIATION

BACKGROUND

When going on vacation, it is common to want to support the various attractions a person visits. The attractions may include parks, museums, and statutes—among others. Often times the attractions have no readily accessible way to support the attraction beyond an entrance fee, etc. For example, if a person goes to a national park there are generally no technological mechanisms for the person to support the park.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

The problem of a user supporting attractions may be especially acute if the person is visiting a general geographic location (e.g., the Grand Canyon) where there are limited human-made structures. As is often the case, the person may have a mobile phone, but not be able to donate to the attraction because there is no identifiable receiver account for the person to send money to. Another problem may arise if the person is visiting a host of attractions over the course of a week but has a limited budget. The person may not know what attractions the person is going to enjoy more or less and may therefore have a difficult time allocating their budget to support each attraction. Accordingly, what is needed is a way to improve the functionality of a computing device in to seamlessly support the attractions the person has enjoyed, while not supporting attractions the person disliked.

As discussed further herein, a trip management system may collect signals from a variety of sources to automatically determine and distribute funds to a variety of attractions a person may visit on a vacation. The signals may originate from devices on the person, devices at the attraction, or other network-connected services (e.g., social media services). The signals may be processed to determine whether or not a person enjoyed the attraction and distribute donations to the attractions accordingly. In such a manner, the person may not need to do anything beyond enjoy their vacation with the knowledge that the attractions are being appropriately supported.

In order to support a trip management system, a number of technical problems may be overcome. For example, but not limited to, challenges may be overcome in the areas of gathering sensor data in remote locations, matching sensor data to a person, artificial intelligence/machine learning, and data pattern matching among disparate types of signals.

Figure 1:
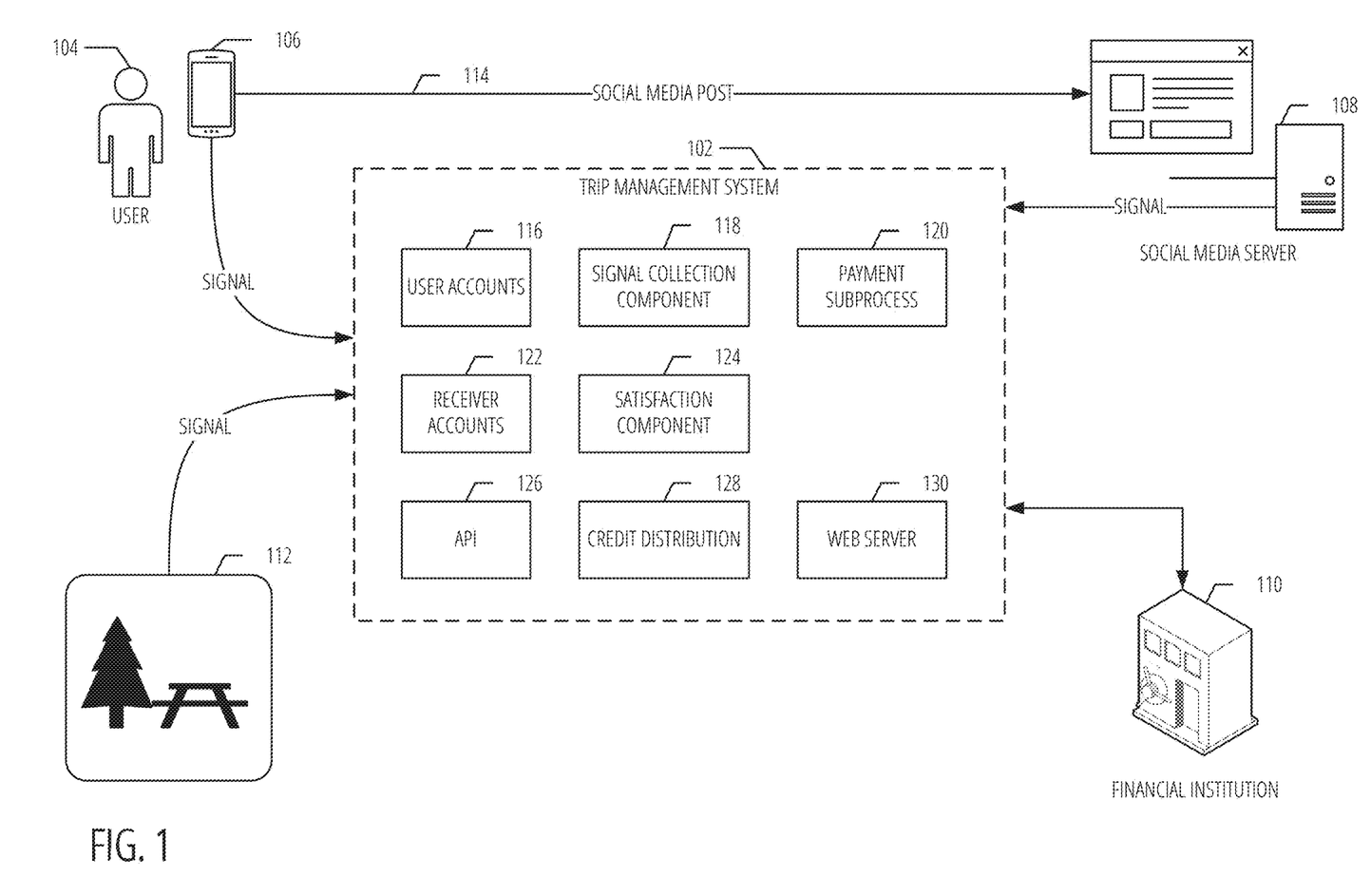
FIG. 1 illustrates a schematic overview of trip management system and a collection of signals from a variety of sources, according to various examples.

FIG. 1 illustrates a schematic overview of trip management system 102 and a collection of signals from a variety of sources, according to various examples. FIG. 1 includes trip management system 102, which includes user accounts 116, signal collection component 118, payment subprocess 120, receiver accounts 122, satisfaction component 124, application programming interface (API) 126, credit distribution 128, and web server 130 (collectively the trip management system 102 components). FIG. 1 further includes user 104 and user device 106 which transmits social media post 114 to social media server 108. Also illustrated in FIG. 1 is attraction 112 and financial institution 110.

The functionality of multiple, individual components in trip management system 102 may be performed by a single component in various examples. A component may represent computer program code that is executable by a processing unit (e.g., a core of a general-purpose computer processor, a graphical processing unit, an application specific integrated circuit, etc.). The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure. In some examples, some or all of the functionality may be performed by a user device such as user device 106.

User 104 may establish a user account with trip management system 102 to facilitate payment to various attractions (e.g., attraction 112) user 104 visits. The user account may be stored as part of user accounts 116. A user account may include, among other items, a user identification, a set of registered user devices associated with the user, a set of external accounts (e.g., social media), and allocation preferences. A more detailed description of a user account is discussed with respect to FIG. 2.

Organizations or other users may establish receiver accounts 122 to enable receipt of payments according to a satisfaction score as discussed in more detail with respect to satisfaction component 124 and credit distribution 128. A receiver account may be associated with one or more attractions. For example, an organization may manage a number of parks. Each attraction may be identified by a geographic area. The geographic area may be defined in a number of ways such as a central geographic coordinate and a radius; or a set of geographic coordinates indicating the metes and bound of the area.

A receiver account may also register one of more devices as associated the account. Devices may be active devices such as cameras or passive devices such as QR codes. In some examples, the devices may be further associated with an attraction of the receiver account. The device may have a set of geographic coordinates/area assigned as well, which may be used to attribute signals to a specific attraction. Accordingly, the devices may be used as the basis for signal collection—using signal collection component 118—in calculating a satisfaction score. For example, a user may scan a QR code indicating the user has enjoyed the attraction.

Another device associated with a receiver account and/or attraction may be a tracking device such as a near field communication (NFC) tag. The NFC tag may be given to a user while the user navigates around an attraction. NFC readers may be placed around an attraction—and also associated with a receiver account—to track a user throughout the attraction. The signals collected using a combination of NFC tags and readers may when track when a user enters an area and when the user exist the area, which gives the total amount of time the user stayed in the area. In various example, user device 106 may include an NFC tag. If a user grants access to an application provided by trip management system 102, the NFC readers may track the user using the included NFC tag.

User and receiver accounts may be created, modified, or deleted using an interface provided by trip management system 102. For example, a web application may be provided via web server 130 or an application may be downloaded to a user's computing device (e.g., user device 106).

Web server 130 may be used to exchange information with user devices, receiver devices, or signal collecting devices via a network such as the Internet. Although generally discussed in the context of delivering webpages via the Hypertext Transfer Protocol (HTTP), other network protocols may be utilized by web servers 110 (e.g., File Transfer Protocol, Telnet, Secure Shell, etc.) In various examples, a user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of a web paged hosted by web server 1301. In response, web server 130 may transmit the web page that is rendered on a display device of user device 106 (e.g., a mobile phone, desktop computer, etc.).

Web server 130 may enable a user to interact with one or more web applications provided in the transmitted web page. A web application may be an account management interface for user or receiver accounts. A web application may provide user interface (UI) components that are rendered on a display device of a computing device. The user may interact (e.g., select, move, enter text into) with the UI components, and, based on the interaction, the web application may update one or more portions of the web page. A web application may be executed in whole, or in part, locally on a client device. The web application may populate the UI components with data from external sources or web server in various examples. The web application may issue API calls to retrieve the data. Conversely, data entered by a user into a UI component may be transmitted using an API (e.g., API 126) call back to the web server.

Data used (e.g., signals, user accounts, receiver accounts, etc.) in trip management system 102 may be organized and stored in a variety of manners. For convenience, the organized collection of data is often described in the context of a database(s) with entries in tables (not illustrated in FIG. 1). The specific storage layout and model used in a database may take a number of forms—indeed, a database may utilize multiple models. The database may be, but is not limited to, a relational database (e.g., SQL), non-relational database (NoSQL) a flat file database, object model, document details model, graph database, shared ledger (e.g., blockchain), or a file system hierarchy. The database may store data on one or more storage devices (e.g., a hard disk, random access memory (RAM), etc.). The storage devices may be in standalone arrays, part of one or more servers, and may be located in one or more geographic areas.

In various examples, the entities depicted in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

Trip management system 102 may implement one or more Application Programming Interfaces (e.g., API 126). An API provides a method for computing processes or device to exchange data. A web-based API may permit communications between two or more computing devices such as a client and a server (e.g., user device 106 and trip management system 102). The API may define a set of HTTP calls according to Representational State Transfer (RESTful) practices. For examples, A RESTful API may define various GET, PUT, POST, DELETE methods to create, replace, update, and delete data stored on in a database on the server. For example, "PUT [website location]/signal/type/userid" may be used to post a signal of a certain type collected by a user device with "userid" to trip management system 102.

APIs may also be defined in frameworks provided by an operating system (OS) manufacturer to access data an application may not regularly be permitted to access. For example, the OS may define an API call to obtain the current location of a mobile device the OS is installed on (e.g., user device 106). In another example, an application provider may use an API call to request biometric sensor data on a user device or other devices paired with the device. By segregating any underlying biometric data—e.g., by using a secure element—the risk of unauthorized transmission of the biometric data may be lowered. An API on user device 106 may also provide access to certain physiological or health data of the user if the user grants access to trip management system 102.

In various examples, signal collection component 118 collect and stores signals for determining a satisfaction score by satisfaction component 124. There may be many types of signals, which may include social media signals, physiological signals, geographic signals, and device signals.

Social media signals may include social media posts associated with the user. Social media posts (e.g., social media post 114 to social media server 108) may be analyzed for sentiment (e.g., using a natural language processing such as a natural language toolkit with Python) associated with a geographic area. The output of the analysis may be a score between −1 and 1, negative to positive sentiment, which may be used in algorithm by satisfaction component 124. In various examples, a post may only be a picture, which may infer a positive sentiment.

Physiological signals may include heart rate data captured by a device worn by the user. The user may grant access to an application stored on user device 106 associated with trip management system 102 to collect the heart rate data. Any data transmitted to trip management system 102 may also include one or more of a timestamp or geographic coordinates. Accordingly, the heart rate data may be attributed with a geographic area and ultimately and an attraction. Other types of physiological signals may also be collected without departing from the scope of this disclosure.

Geographic signals may include indications of where a user is, or has been, at a given time. For example, if NFC tracking is used, every time a beacon read an NFC tag it may transmit a notification, via API 126, noting the tag's identifier and a timestamp of when the tag was read. In other examples, a user device may periodically transmit the geographic coordinates of the user device. In such a manner, trip management system 102 may be able to determine where a user is currently, how long the user has been there, and how long the user has been in other locations in the past.

Device signals may indicate use of a user device. Usage may include using a camera on the device, turning on the display of the device, turning off the display on the device, CPU usage, and app usage. Different device use signals may imply different levels of engagement with a particular area. For example, using the camera may indicate the user is enjoying him or herself. In contrast, if a user has the display on the user device for a prolonged period of time (e.g., set at a threshold amount), but is not using the camera, it may imply the user is bored. As with the other signals, device signals may include a timestamp allowing the signal to be matched with an attraction given the collected geographic signals. In some examples, a baseline of each type of device metric is stored. For example, a user may generally have the display on 5 minutes an hour. The baseline may be made prior to a trip being taken by a user. The device signals may indicate a percentage change with respect to the baseline.

Satisfaction component 124 may calculate a satisfaction score for a given attraction based on the signals collected by signal collection component 118. Calculating the score may be performed in a variety of manners. Each type of signal may have a stored mapping between signal value and a quantitative satisfaction value. For example, one formula may include giving a point for each time a picture is taken, a positive social media post is made, and for every 5 minutes a user is within the attraction. Points may be deducted if a social media post is negative or if the user is only within the attraction for less than 5 minutes total. Point values may also be assigned for different heart rate changes. For example, if a user's heart rate increases by 15% an extra point may be added.

Weighted scores may also be used by satisfaction component 124. For example, there may be a total social media score, a total physiological score, and a total geographic score which may be weighted 20%, 40%, and 20%, respectively. The weights may be assigned by an administrator of trip management system 102 or as a user preference stored within the user's account.

Satisfaction component 124 may also use machine learning to calculate a satisfaction score for an attraction. For example, when a user exits an attraction a request may be presented (e.g., as a push notification) to user device 106 asking if the user enjoyed (e.g., positive or negative) the attraction. The user's answer along with collected signal within the attraction may create a training data point for a machine learning model such as a feed-forward neural network. The signals may be encoded as quantitate inputs in a feature vector. The expected output of the training data point may a '1' if the experience was positive and a '0' for a negative experience. By performing this process over a period of weeks, a large training data set may be created that may be used to train the machine learning model. Each attraction may have a different machine learning model because the signals that indicate a positive experience for one attraction may correlate with a negative experience for another attraction.

The trained machine learning models be used be used satisfaction component 124 to calculate a satisfaction score for future users. For example, the signals collected while the user is within an attraction may be encoded in a feature vector and input into the trained machine learning model of the attraction. The output may be a score between 0 and 1 indicating the probability the user enjoyed the attraction with 1 indicating the user enjoyed the attraction.

In various example, a user may have set a total amount of money to give to the various attractions the user may visit over the user's vacation. Credit distribution 128 may determine an allocation between a number of visited attractions. The allocation may be set be trip management system 102 or by user preferences. For example, there may be a threshold satisfaction score (e.g., above >0.5) for an attraction to be included in the credit distribution. Then, any remaining attractions may be given their pro-rata amount based on their respective satisfaction score. For example, if attraction A had a score of 0.75 and attraction B had a score of 0.6, attraction A would be get 55% of whatever amount the user had set aside to give.

Credit distribution 128 may also be used even if a total amount of money was not set. For example, a user may set a maximum amount to give per attraction as a user preference. Credit distribution 128 may give the pro-rata amount based on the satisfaction score for the attraction. For example, if the maximum amount was $10 dollars, an attraction getting a 0.79 score would get $7.90. A threshold satisfaction score may also be set.

Payment subprocess 120 may use the output of credit distribution 128 to initiate payments to the attractions. Payment subprocess 120 may access receiver accounts 122 to determine a financial institution (e.g., financial institution 110) associated with the attraction and initiate a payment for the amount—as determined by credit distribution 128— from a financial account of the user to a financial account of the receiver using payment techniques as are known in the art.

Figure 2:
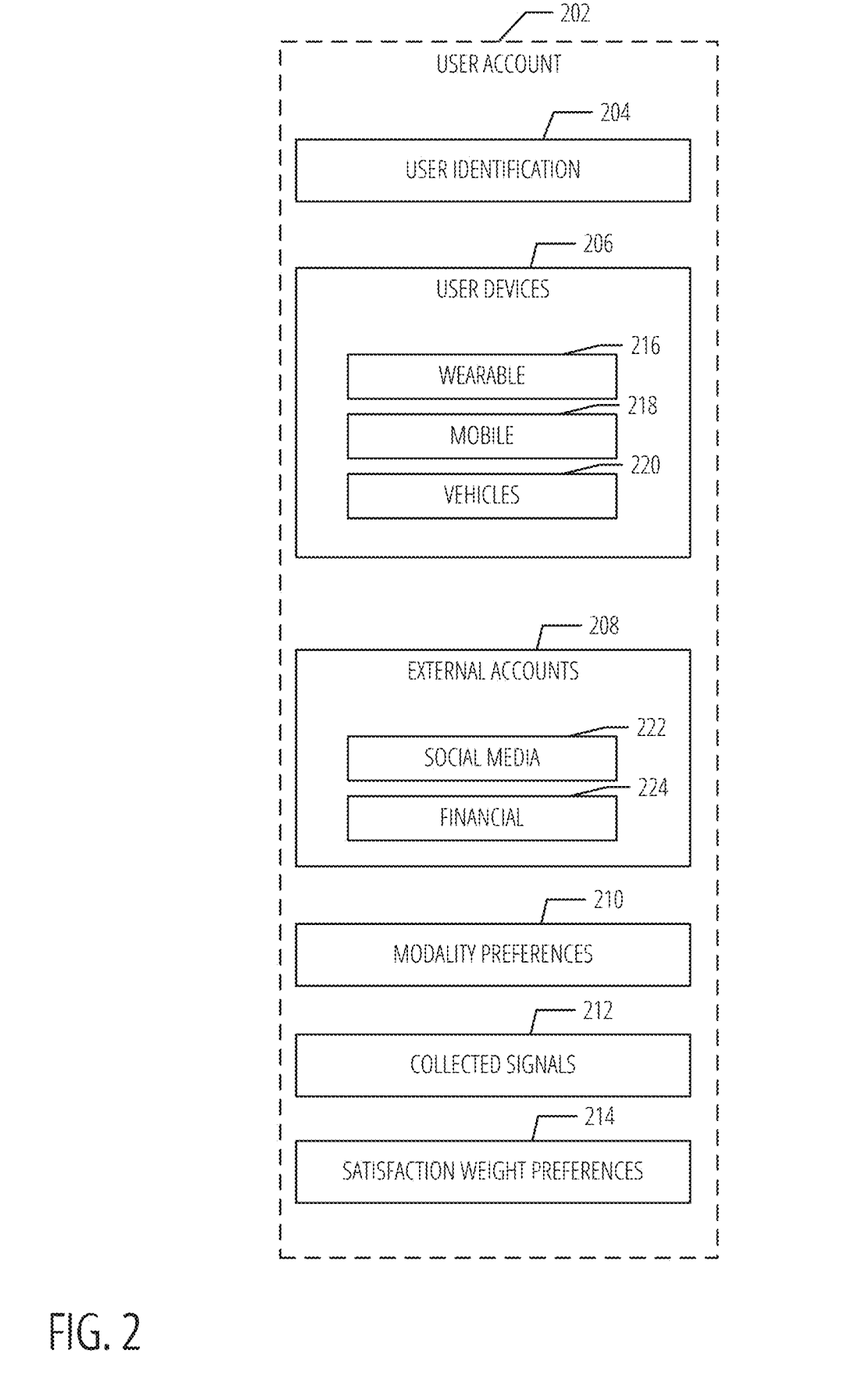
FIG. 2 is a diagram illustrating a schematic representation of a user account, according to various examples.

FIG. 2 is a diagram illustrating a schematic representation of user account 202, according to various examples. User account 202 includes user identification 204, user devices 206, external accounts 208, modality preferences 210, collected signals 212, and satisfaction weight preferences 214. User devices 206 includes wearable device 216, mobile device 218, and vehicle devices 220. External accounts 208 includes social media accounts 222 and financial account 224.

User identification 204 may be a login identifier for a user after creating user account 202. In various examples, signals transmitted from user devices 206 include user identification 204 for associating the signals with the correct user.

User devices 206 may be a set of devices registered by the user as associated with the user. Registering may include manual input by the user or automatic registering by trip management system 102. For example, a user may input in the phone number of mobile device 218 to register the user's phone. In some examples, an application on the mobile device 218 may assist in registering other devices. For example, the application may leverage Bluetooth or Personal-Area-Network protocols such as IEEE 802.15.4, etc., to see devices paired by mobile device 218 or discover new devices such as wearable device 216 (e.g., watches, VR/AR goggles) or vehicle device 220. In various examples, some of user devices 206 may not be able to communicate directly with trip management system 102. Instead, these devices may communicate with an intermediary device such as mobile device 218, which may in turn relay the signal to trip management system 102.

Vehicle device 220 may be a device that the user owns, rents, or is currently an occupant in. Trip management system 102 may communicate with vehicle device 220 directly or indirectly. For example, an application associated with trip management system 102 may be installed in the OS of the car's entertainment system which may relay information such as GPS coordinates of the vehicle. Trip management system 102 may communicate with vehicle device 220 via a manufacturer provided service in various examples or a ride-sharing service that the user is an occupant in. Vehicle device 220 may be identified by its vehicle identification number or license plate in various examples. Geographic signals may be obtained by cameras operated by a receiver by scanning an area for the license plate of vehicle device 220.

The devices registered in user devices 206 may periodically (e.g., every five minutes) transmit—directly or via the relay method—their respectively collected signals to trip management system 102. In some examples, user devices 206 may batch transmitted their signals upon a triggering event such as exiting a geographic area or attraction. The signals may be transmitted as a data structure that include one or more of a data payload (e.g., geocoordinates, device state), a type, a timestamp, and a device identifier.

Social media accounts 222 may be an account that has been registered for monitoring by trip management system 102. For example, a user may grant read-only access to one or more social media account registered by the user.

Financial account 224 may include account information related to payment accounts of the user and preferences of which account to use to pay receivers. For examples, financial account 224 may be a credit card number or checking account/routing information.

Modality preferences 210 may store the preferences of the user with respect to credit distribution. Modes may include automatic giving, approval giving, and delayed giving.

In an automatic mode the user may allow trip management system 102 to automatically decide when to give money to the receiving accounts. Accordingly, with no input from the user, trip management system 102 may use stored defaults for how much to give to an attraction based on calculated satisfaction scores. A payment made from financial account 224 may occur every time a user exits an attraction. An application associated with trip management system 102 installed on mobile device 218 may transmit an indication that a user exits the attraction based on geofence surrounding the attraction. In another example, payments may be made according to a predetermined schedule, such as every three hours.

In an approval giving mode, periodically (e.g., every hour), or based on triggers (e.g., entering/exited locations), a suggestion may be presented on one of user devices 206 of how much to give to one or more receiving accounts of attractions visited by the user. The suggestions may be based on similar criteria as in the automatic mode; however, instead of automatically giving, the user may approve or change the amount to give.

In a delayed giving mode, trip management system 102 may wait until the end of the day or an entire trip to determine how much to give to each receiver account. As part of user account 202 a user may input in attractions the user is planning on visiting and/or dates of travel for a trip. These inputs may also be used to trigger signals collection beginning and end times. Accordingly, trip management system 102 may not collect signals from any user device outside of the planned trip period.

Accordingly, more intelligent giving decisions may be made if only a certain of money if a user set a limit on the amount of money for a trip in user account 202. Consider the scenario in which the user visits fives places during a trip and a $50 maximum amount for giving. Then, the user visits the first place and the satisfaction metric is high (e.g., above 0.8) and the automatic mode would have given $40 to the first place. This means, even if the user likes the last four places equally as much as the first, the last four places get less. Indeed, the last three places may receive nothing if the remaining $10 go to the second place. In order to account for this scenario, trip management system 102 may collect signals for an entire day or trip. Then, each place may be given a pro-rata amount based on the total satisfaction metric for the day or trip.

Collected signals 212 may be the set of signals collected across all user devices and devices associated with receiver accounts attributable to the user. For example, collected signals 212 may include NFC tracking data, physiological signals of wearables, etc.

Satisfaction weight preferences 214 may allow the user to set the relative importance of different types of signals or types of signals for determining the satisfaction score. For example, web server 130 may present an interface with drop-down menus with ratings (e.g., one to five) for each type of signal.

In various examples, user account 202 may store other user preferences of a user such as the maximum amount to give per location, per day, and allowed/disallowed signals.

Figure 3:
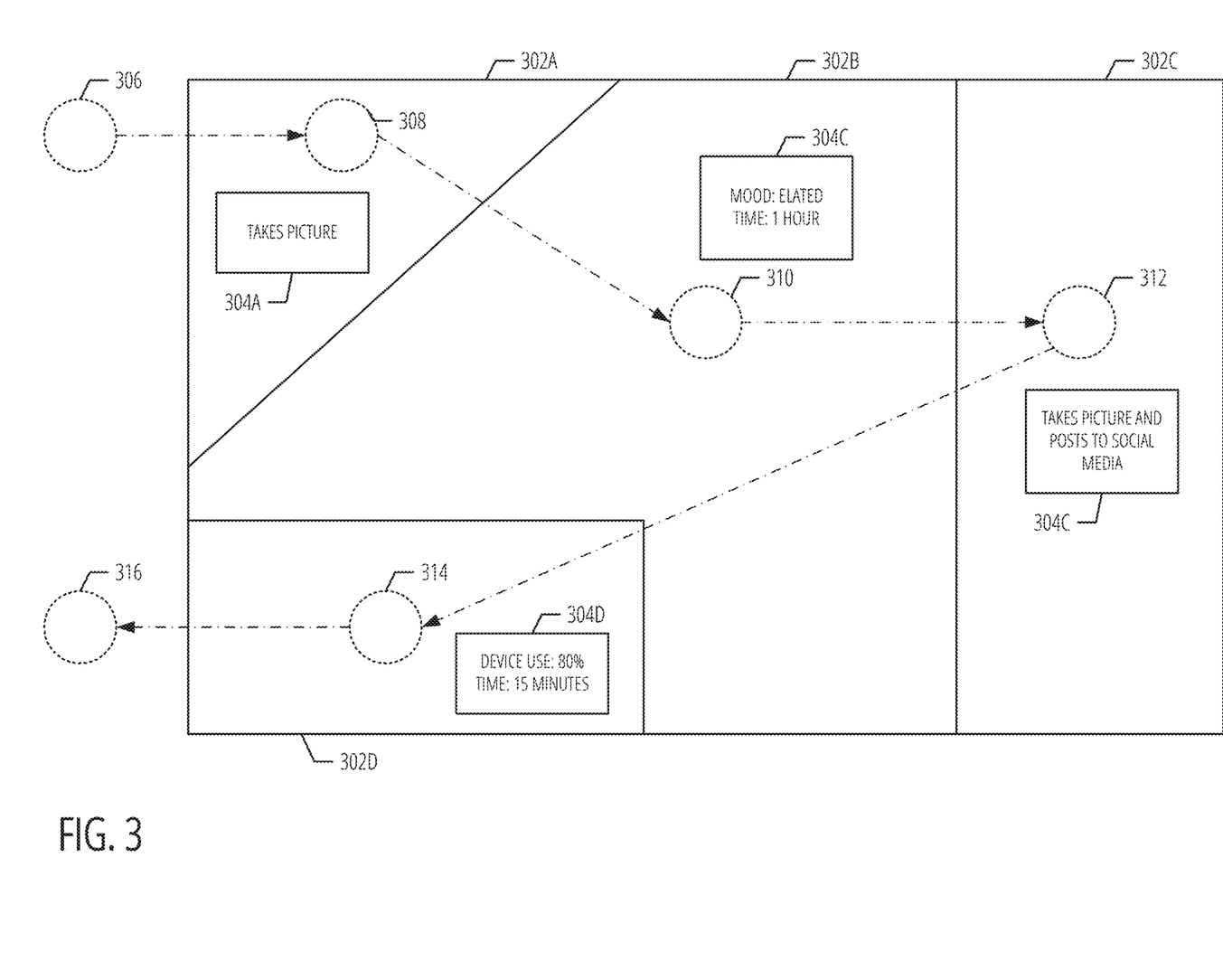
FIG. 3 is representation of a user's route through multiple attractions in a geographic area, according to various examples.

FIG. 3 is representation of a user's route through multiple attractions in a geographic area, according to various examples. FIG. 3 includes regions 302A-D, signals 304A-D, and user locations 306-316. Each region may be an attraction that the user navigates through during a trip. For example, region 302A may be a museum, region 302B may be a lake, region 302C may be a monument, and region 302D may be another museum. Attractions may be associated with the same or different receiver accounts, in various examples.

A user may begin at location 306 and when the user crosses into region 302A, signal collection may begin. At location 308, a user may take a picture. Accordingly, a user device signal may transmit a message to trip management system 102 indicating that the user is currently within region 302A and that the user took a picture.

A user may then move to location 310 in region 302B. A user's wearable device may indicate that the user's current mode is that of elation. Either a user device or a device associated with region 302B may note that the user spent an hour in region 302B. These signals may be transmitted to trip management system 102 upon the user exiting region 302B and entering 302C.

At location 312, the user may take a picture and post it to a social media account. Trip management system 102 may receive a notification from a social media network that the user posted a picture. Trip management system 102 may store a signal indicating that the user posted a picture within region 302C.

A user may then move to location 314 within region 302D. A device of the user may note that the user's device was on 80% of the 15 minutes the user was within region 304D. This information may be transmitted to trip management system 102 as a signal as well. Signal collection may stop when the user exits to location 316. Locations 306 and 316 may be locations that not located in a region associated with a receiver account in trip management system 102.

Figure 4:
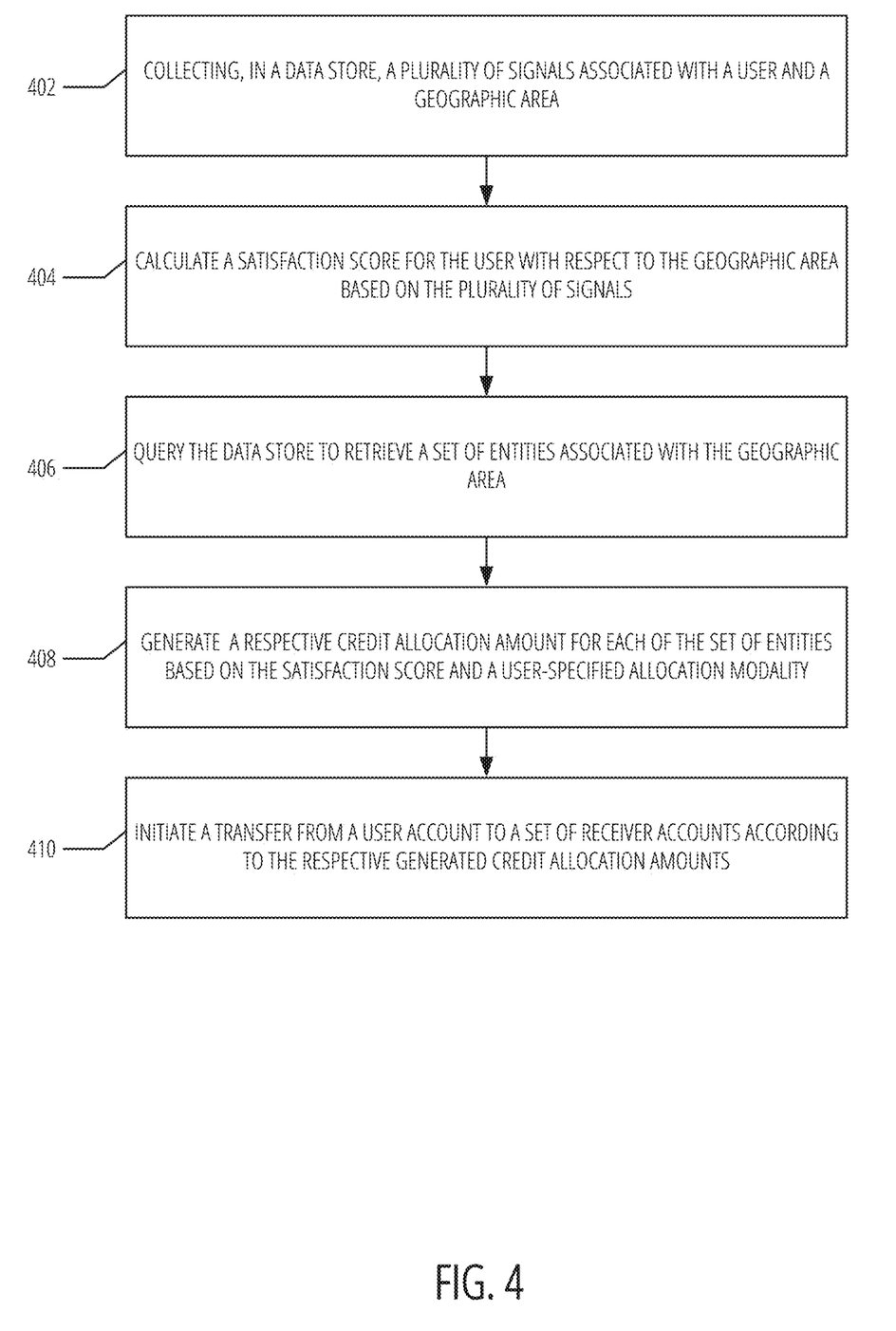
FIG. 4 is a flowchart illustrating a method to calculate a satisfaction score, according to various examples.

FIG. 4 is a flowchart illustrating a method to calculate a satisfaction score, according to various examples. The method is represented as a set of blocks that describe operations 402-410 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 402, in various examples, signals may be collected in a data store. The plurality of signals may be associated with a user and a geographic area. For example, the signals may be collected at a system such as trip management system 102. Signals may originate from a variety of locations. For example, signals may come from accessing data from a computing device located within the geographic area. The computing device may be registered with a user account of the user or as part of a receiver account. The computing device may monitor physiological signals of the user or computing device usage metrics. A computing device usage metric may be whether or not a camera sensor has been used within the geographic area. A signal may indicate a length of time the user has been located within the geographic area collected.

At operation 404, in various examples, a satisfaction score may be calculated for the user with respect to the geographic area based on the plurality of signals. The geographic area may be associated with a number of entities (e.g., receiver accounts).

Each of the entities may be associated with one or more attractions within the geographic area. Accordingly, at operation 406 the data store may be queried to retrieve the set of entities associated with the geographic area.

In various examples, a satisfaction score is calculated for each attraction within the geographic area. The satisfaction score may be calculated by accessing a trained machine learning model and using the collected signals attributable to the attraction as an input. In various examples, a weighted formula may be used.

At operation 408, in various examples, a respective credit allocation amount for each of the set of entities is generated based on the satisfaction score and a user-specified allocation modality. The credit allocation may determine the percentage split for each receiver account. For example, one receiver account may be allocated 40% and a second receiver account may be allocated 60%. The allocating may be based on which signals have been attributed to which entity and the respective satisfaction scores for the entity. The allocation formula may be based on user specified preferences, in various examples.

At operation 410, in various examples, a transfer may be initiated from a user account to a set of receiver accounts according to the respective generated credit allocation amounts. For example, if the user indicated $20 of total giving, the first receiver account may be given $12 and the second receiver account $8. Initiating may include transmitting a payment instruction to a payment processor, in various examples. The allocating and transfer may be performed according to the user-specified modality. For example, in an automatic modality, generating the respective credit allocation and initiating the transfer may be performed periodically according to a schedule.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
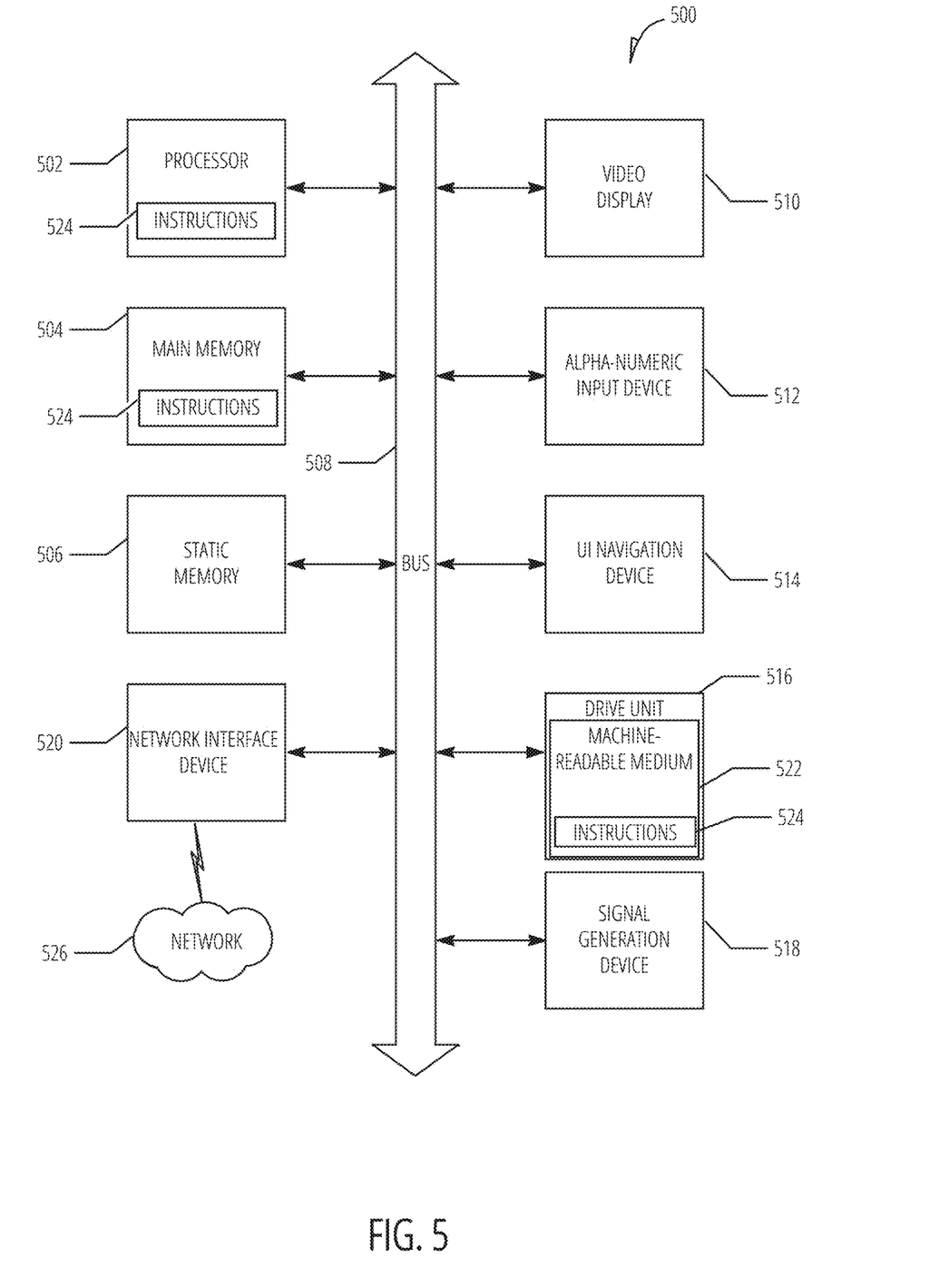
FIG. 5 is a block diagram illustrating an example machine upon which any one or more of the techniques (e.g., methodologies) discussed herein may be performed, according to various examples.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
    receiving data from a user relating to a plurality of geographic locations the user intends on visiting and a time period within which the user intends on visiting the plurality of geographic locations;
    collecting, in a data store, a plurality of signals associated with the user and a geographic area of the plurality of geographic locations, wherein one of the plurality of signals is collected from a biometric sensor of a user device associated with the user when the user is at the geographic area;
    querying the data store to retrieve a set of entities associated with the plurality of geographic areas visited by the user;
    attributing a first subset of the plurality of signals to a first entity of the set of entities and a second subset of the plurality of signals to a second entity of the set of entities;
    calculating, after expiration of the time period and using at least one processor, a satisfaction score for the user associated with an entity of the set of entities based on the plurality of signals including the one of the plurality of signals collected from the biometric sensor of the user device associated with the user, wherein a signal of the plurality of signals is one of a length of time the user has been located within the geographic area and a physiological reaction of the user collected from the biometric sensor when the user is at the geographic area;

generating, using the at least one processor, a respective credit allocation amount for each of the set of entities based on the satisfaction score, attributing the first subset of the plurality of signals to the first entity and the second subset of the plurality of signals to the second entity, and a user-specified allocation modality such that all entities of the set of entities receive an allocation amount, wherein:

entities with a higher satisfaction score are allocated a higher amount of the respective credit allocation amount; and     when the user-specified allocation modality is an automatic modality, the method further comprises periodically performing the generating of the respective credit allocation;

presenting to the user a suggestion to transfer amounts from a user account to a set of receiver accounts according to the respective generated credit allocation amounts;

receiving a response from the user; and initiating, based on the received response, the transfer of the amounts from the user account to the set of receiver accounts according to the respective generated credit allocation amounts.

2. The method of claim 1, wherein collecting the plurality of signals includes accessing data from a computing device located within the geographic area.

3. The method of claim 1, wherein collecting the plurality of signals includes accessing data from a computing device registered to the user in a user account.

4. The method of claim 3, wherein one of the plurality of signals is a computing device usage metric collected from the computing device.

5. The method of claim 4, wherein the usage metric indicates whether or not a camera sensor has been used within the geographic area.

6. The method of claim 1, further comprising initiating the transfer according to a schedule.

7. A system comprising:

at least one processor;

a storage device comprising instructions, which when executed by the at least one processor, configure the system to perform operations comprising:

receiving data from a user relating to a plurality of geographic locations the user intends on visiting and a time period within which the user intends on visiting the plurality of geographic locations;

collecting, in a data store, a plurality of signals associated with the user and a geographic area of the plurality of geographic locations, wherein one of the plurality of signals is collected from a biometric sensor of a user device associated with the user when the user is at the geographic area;

querying the data store to retrieve a set of entities associated with the plurality of geographic areas visited by the user;

attributing a first subset of the plurality of signals to a first entity of the set of entities and a second subset of the plurality of signals to a second entity of the set of entities;

calculating, after expiration of the time period and using the least one processor, a satisfaction score for the user associated with an entity of the set of entities based on the plurality of signals including the one of the plurality of signals collected from the biometric sensor of the user device associated with the user, wherein a signal of the plurality of signals is one of a length of time the user has been located within the geographic area and a physiological reaction of the user collected from the biometric sensor when the user is at the geographic area;

generating, using the at least one processor, a respective credit allocation amount for each of the set of entities based on the satisfaction score, attributing the first subset of the plurality of signals to the first entity and the second subset of the plurality of signals to the second entity, and a user-specified allocation modality such that all entities of the set of entities receive an allocation amount, wherein:

entities with a higher satisfaction score are allocated a higher amount of the respective credit allocation amount; and         when the user-specified allocation modality is an automatic modality, the instructions further configuring the system to periodically perform the generating of the respective credit allocation;

presenting to the user a suggestion to transfer amounts from a user account to a set of receiver accounts according to the respective generated credit allocation amounts;

receiving a response from the user; and initiating, based on the received response, the transfer of the amounts from the user account to the set of receiver accounts according to the respective generated credit allocation amounts.

8. The system of claim 7, wherein collecting the plurality of signals includes accessing data from a computing device located within the geographic area.

9. The system of claim 7, wherein collecting the plurality of signals includes accessing data from a computing device registered to the user in a user account.

10. A non-transitory computer-readable medium comprising instructions, which when executed by at least one processor, configure the at least one processor to perform operations comprising:

receiving data from a user relating to a plurality of geographic locations the user intends on visiting and a time period within which the user intends on visiting the plurality of geographic locations;

collecting, in a data store, a plurality of signals associated with the user and a geographic area of the plurality of geographic locations, wherein one of the plurality of signals is collected from a biometric sensor of a user device associated with the user when the user is at the geographic area;

querying the data store to retrieve a set of entities associated with the plurality of geographic areas visited by the user;

attributing a first subset of the plurality of signals to a first entity of the set of entities and a second subset of the plurality of signals to a second entity of the set of entities;

calculating after expiration of the time period a satisfaction score for the user associated with an entity of the set of entities based on the plurality of signals including the one of the plurality of signals collected from the biometric sensor of the user device associated with the user, wherein a signal of the plurality of signals is one of a length of time the user has been located within the geographic area and a physiological reaction of the user collected from the biometric sensor when the user is at the geographic area;

generating a respective credit allocation amount for each of the set of entities based on the satisfaction score, attributing the first subset of the plurality of signals to the first entity and the second subset of the plurality of signals to the second entity, and a user-specified allocation modality such that all entities of the set of entities receive an allocation amount, wherein:

entities with a higher satisfaction score are allocated a higher amount of the respective credit allocation amount; and when the user-specified allocation modality is an automatic modality, the instructions further configuring the at least one processor to periodically perform the generating of the respective credit allocation;

presenting to the user a suggestion to transfer amounts from a user account to a set of receiver accounts according to the respective generated credit allocation amounts;

receiving a response from the user; and initiating, based on the received response, the transfer of the amounts from the user account to the set of receiver accounts according to the respective generated credit allocation amounts.

11. The computer-readable medium of claim 10, wherein collecting the plurality of signals includes accessing data from a computing device located within the geographic area.

12. The computer-readable medium of claim 10, wherein collecting the plurality of signals includes accessing data from a computing device registered to the user in a user account.

\* \* \* \* \*